July 26, 1955
J. PHYL
2,713,920
MECHANICAL DUST COLLECTOR
Filed July 1, 1953
2 Sheets-Sheet 2
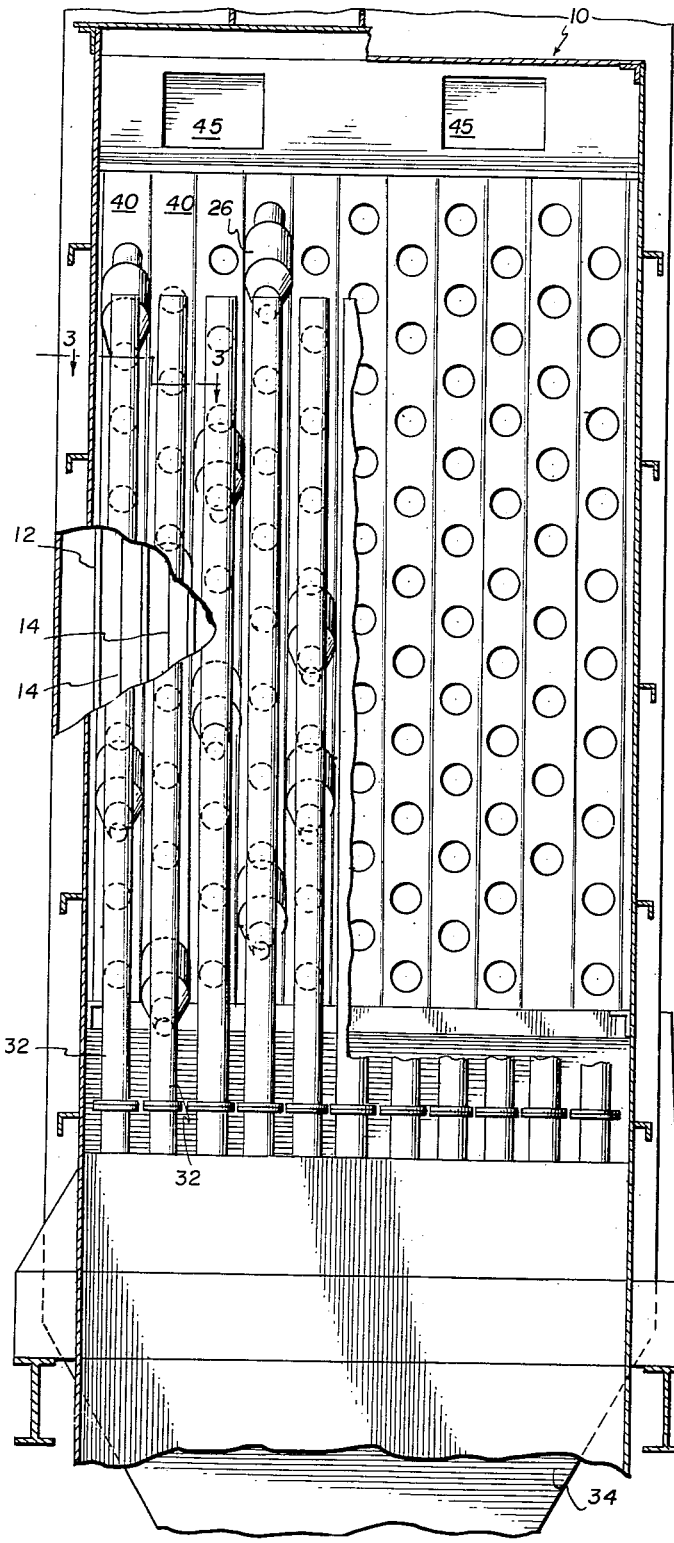
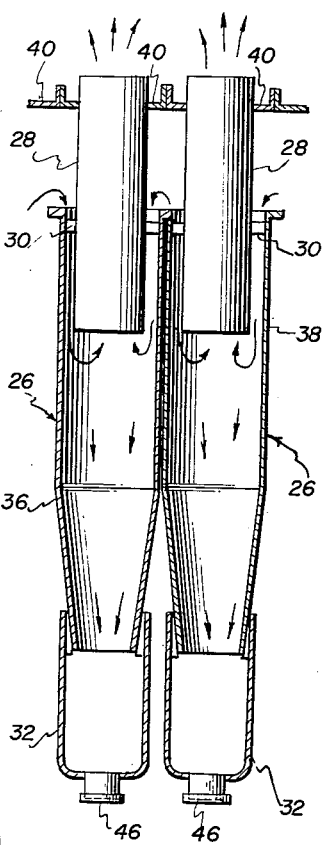
INVENTOR.
JOSEPH PHYL.
BY Harold T. Stowell
ATTORNEY.

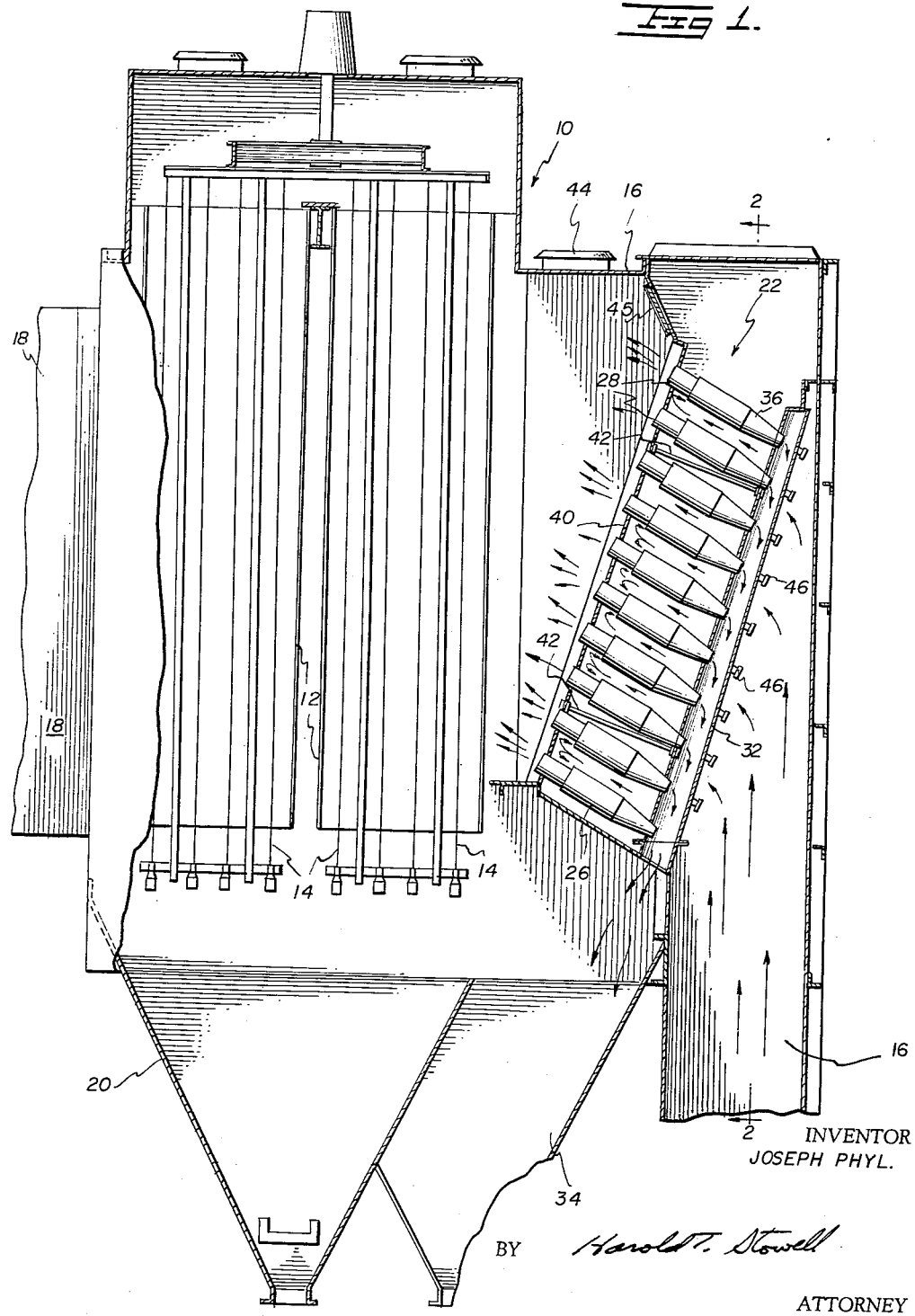

United States Patent Office
2,713,920
Patented July 26, 1955

2,713,920

MECHANICAL DUST COLLECTOR

Joseph Phyl, Fanwood, N. J., assignor to Research Corporation, New York, N. Y., a corporation of New York Application July 1, 1953, Serial No. 365,329

2 Claims. (Cl. 183—7)

This invention relates to an improved mechanical collector for the separation of suspended materials from gases. More particularly the invention relates to an improved mechanical collector comprising a plurality of individual cyclone type separator tubes arranged in superimposed position to form a single collector unit.

It is an object of the invention to provide such a device wherein the dust discharge tube of each collector unit terminates at a common dust chute so positioned that discharging dust from each tube will fall free to a lower dust storage bin or hopper preventing blockage or dust build-up in the dust chute.

A further object is to provide such a device wherein the dust chutes are the gas distribution means for the mechanical collector.

A further object is to provide a mechanical collector that may be advantageously installed in gas inlet flues with the gas entering vertically from the top or bottom, horizontally toward the dust chutes, or sideways at right angles to the dust chutes.

Another object is to provide a mechanical collector of the type described wherein each unit is easy to remove for replacement and repair and speedy installation of the prefabricated units substantially shortens costly outage of boilers and the like.

A further object is to provide such a collector wherein the gas outlet tubes of each unit may be readily removed as a unit for replacing and repair of the spinner elements outside of the mechanical collector housing.

These and other objects and advantages are provided by the centrifugal dust collector which generally comprises a plurality of vertical rows of centrifugal separators, each row comprising a plurality of superimposed parallel separator tubes disposed at an acute angle to the horizontal, corresponding outlet tubes concentrically positioned in the higher end of each of the separator tubes, and means adjacent the said ends of the separator tubes for imparting a vertical motion to gas entering said ends of the separator tubes, a dust chute adjacent to and communicating with the lower ends of the separator tubes of each of the vertical rows, adjacent dust chutes being spaced apart to provide for the flow of gas therebetween into the space between the separator tubes, and a sheet member supporting each row of outlet tubes of the centrifugal collector and preventing the flow of gas therethrough.

The invention will be more particularly described in reference to the illustrative embodiments thereof in which:

Fig. 1 is a vertical sectional view of one form of the mechanical collector of the invention employed in combination with a typical electrostatic precipitator;

Fig. 2 is a section on line 2—2 of Fig. 1 with the right hand portion broken away to more clearly show the staggered arrangements of the individual separator tubes; and Fig. 3 is an enlarged detailed view on line 3—3 of Fig. 2.

With reference to the drawings, 10 is the casing of a typical electrostatic precipitator within which are complementary collecting and discharge electrodes 12 and 14, respectively, a gas inlet flue 16 and a gas outlet flue 18 are provided in opposite side walls of the casing for directing a flow of gas to be cleaned between the complementary electrodes where particulate material suspended in the gas is removed and collected in hopper 20 in the well known manner.

Positioned in the gas inlet flue is the novel mechanical dust separator of the invention generally designated 22.

The mechanical collector comprises a plurality of parallel rows of superimposed centrifugal separators. The separators each comprise a separator tube 26 disposed with its major axis at an acute angle to the horizontal, and a corresponding outlet tube 28 concentrically positioned in the upper or higher end of the separator tubes. At the upper end of each separator tube, between the outside wall of the outlet tube and the inside wall of the separator tube, are positioned the gas spinning vanes generally designated 30.

The lower end of each separator tube communicates with a dust chute or tube 32. As is more clearly shown in Fig. 2 of the drawings, the lower ends of each collector tube in each of the vertical rows are in communication with the same dust chute.

The upper ends of the dust chutes are closed, while the lower ends communicate with a central dust hopper 34. As more clearly shown in Fig. 1 of the drawings, the lower ends of each of the separator tubes is stepped laterally inwardly from the uppermost tube of each row downwardly. In the preferred form of the invention the distance the lower end of each separator tube is stepped inwardly of the next higher tube is so selected that collected material discharging from the next higher tube will fall clear of the dust outlet of the next lower tube.

The dust chutes 32 of each of the vertical rows of collectors are positioned to follow the general slope of the lower ends of the outlet tubes so that the collected material is directed to the hopper 34 out of contact with the outlets of the superimposed tubes. This arrangement of the discharge chutes and separator tubes provides a free flow of dust to the storage hopper and substantially reduces the tendency of the separator to become blocked and prevents dust build-up in the dust chutes.

The lower or discharge ends of the separator tubes are tapered inwardly as at 36, permitting the use of dust chutes which have a smaller cross section than the diameter of the body portion 38 of the separator tubes. This arrangement makes possible the spaces X between adjacent rows of dust chutes to provide for the flow of gas therebetween into the space between the collector tubes and about the gas spinning vanes 30.

The outlet tubes of each vertical row of mechanical collectors are provided with a header plate 40 through which the discharge tubes 26 pass and to which these tubes are secured. The width of the header plates is so selected that adjacent header plates form a continuous wall extending across the inlet flue.

The header plates of each row of tubes is connected to its corresponding dust chute by the bolts 42, two of which are shown in Fig. 1 of the drawings. Thus it will be seen that each vertical row of tubes comprises a separate and distinct unit and may be installed and removed as such. This form of construction also substantially simplifies cleaning and replacement of the spinning vanes as the entire header plate, and its connected outlet tubes and spinning vanes may be removed as a unit by simply removing the tie bolts 42 for the unit. A cover plate shown at 44 in Fig. 1 is conveniently located adjacent the upper end of the header plates so they may be removed and the cleaning and repairing of the spinning vanes carried on outside of the inlet flue.

Another novel feature of the present invention is clearly illustrated in Fig. 2 of the drawings, wherein it will be seen that the mechanical collectors of adjacent rows are staggered thus permitting to line up the outlet tubes of the collectors with the duct spacing of electrostatic precipitators in general use. The dust spacing of electrostatic precipitators are generally 8.75", 10", 15", etc. Thus 9 inch diameter tubes could be lined up with precipitator ducts 8.75 inches wide, etc. providing a substantial saving in space without affecting the best possible gas distribution to the electrostatic collector.

The mechanical collector arrangement of the invention is provided with gas bypass means for bypassing gas through or around the mechanical collector tubes in the event that the boiler or other dust producing apparatus are oil or gas fired.

The means for bypassing the gas around the tubes is the damper or slidegate 45. The means for passing the gas directly through the tubes are the capped nipples 46. By simply removing the caps from the dust chute nipples, the dirty gases pass straight through the collector pipes without going through the spinning vanes.

The capped nipples 46 may also be used to advantage if the dust chute or separator pipes become clogged with collected material. As it will be seen that by merely removing the plugs the main gas stream may be directed against the collected material.

From the foregoing description it will be seen that the described mechanical collector fully accomplishes the aims, objects and advantages of the invention.

While the invention has been described in detail with reference to a collector having a gas inlet which is vertically upward, it will be apparent that the inlet may be variously positioned without adversely affecting the efficient gas distribution provided by the spaced dust chutes 32. It will also be apparent that the dust collector may be advantageously positioned in the gas outlet conduit of an electrical precipitator instead of in the gas inlet conduit as shown by way of example.

I claim:

1. A centrifugal dust collector comprising a plurality of vertical rows of centrifugal separator units, each row comprising a plurality of superimposed parallel separator tubes disposed at an acute angle to the horizontal, corresponding outlet tubes concentrically positioned in the higher end of each of the separator tubes, and means adjacent the said ends of said separator tubes for imparting a vortical motion to gas entering said ends of said separator tubes, a dust chute adjacent to and communicating with the lower ends of the separator tubes of each of the said vertical rows, adjacent dust chutes being spaced apart to provide for the flow of gas therebetween into the space between the separator tubes, a sheet member supporting the outlet tubes of each vertical row of separator units and preventing the flow of gas therebetween, said dust chutes having an opening opposite the lower end of each of the separator tubes, and removable caps provided for each of said openings whereby the flow of gas may be directed through each of said separator tubes without passing through said means for imparting a vortical motion to the gas stream.

2. In combination with a horizontal gas flow electrostatic precipitator comprising a vertically extending housing, spaced vertically extending rows of complementary discharge and extended surface electrodes positioned in said housing, gas inlet and outlet conduits adjacent the vertical edges of the extended surface electrodes, a centrifugal dust collector positioned in one of said conduits comprising a plurality of spaced vertical rows of centrifugal separator units, each row comprising a plurality of superimposed parallel separator tubes disposed at an acute angle to the horizontal, corresponding outlet tubes concentrically positioned in the higher end of each of the separator tubes, the upper ends of the tubes in each of the spaced rows positioned to align with the space between adjacent extended surface electrodes, means adjacent the ends of the separator tubes for imparting a vortical motion to gas entering said ends of said separator tubes, a dust chute adjacent to and communicating with the lower ends of the separator tubes of each of said vertical rows, adjacent dust chutes being spaced apart to provide for the flow of gas therebetween into the space between the separator tubes, a sheet member supporting the outlet tubes of said collector and preventing the flow of gas to the complementary electrodes except through the outlet tubes, said dust chutes having an opening opposite the lower end of each of the separator tubes, and removable caps provided for each of said openings whereby the flow of gas may be directed through each of said separator tubes without passing through said means for imparting a vortical motion to the gas stream.

References Cited in the file of this patent

UNITED STATES PATENTS

| | | |
|---|---|---|
| 1,997,125 | Soyez et al. | Apr. 9, 1935 |
| 2,422,563 | Pegg | June 17, 1947 |
| 2,424,572 | Lincoln | July 29, 1947 |
| 2,438,827 | Shoffner | Mar. 30, 1948 |
| 2,521,380 | Lichtenfels | Sept. 5, 1950 |

FOREIGN PATENTS

| | | |
|---|---|---|
| 757,409 | France | Dec. 26, 1933 |